(12) United States Patent
Robinson et al.

(10) Patent No.: US 8,248,511 B2
(45) Date of Patent: Aug. 21, 2012

(54) DUAL-MODE EXTENDED DEPTH-OF-FIELD IMAGING SYSTEMS

(75) Inventors: M. Dirk Robinson, Menlo Park, CA (US); David G. Stork, Portola Valley, CA (US)

(73) Assignee: Ricoh Co., Ltd., Tokyo (JP)

( * ) Notice: Subject to any disclaimer, the term of this patent is extended or adjusted under 35 U.S.C. 154(b) by 305 days.

(21) Appl. No.: 12/571,019

(22) Filed: Sep. 30, 2009

(65) Prior Publication Data

US 2011/0074988 A1  Mar. 31, 2011

(51) Int. Cl.
*H04N 5/225* (2006.01)

(52) U.S. Cl. .............................. 348/335; 348/273

(58) Field of Classification Search .............. 348/230.1, 348/239, 241, 266, 267, 268, 272, 273, 277, 348/280, 289, 335, 340, 345; 359/16
See application file for complete search history.

(56) References Cited

U.S. PATENT DOCUMENTS

| | | | |
|---|---|---|---|
| 5,307,175 A * | 4/1994 | Seachman | 358/401 |
| 5,468,950 A | 11/1995 | Hanson | |
| 5,748,371 A | 5/1998 | Cathey, Jr. et al. | |
| 5,770,847 A | 6/1998 | Olmstead | |
| 6,697,522 B1 * | 2/2004 | Ishikawa | 382/167 |
| 7,224,540 B2 | 5/2007 | Olmstead et al. | |
| 7,336,430 B2 | 2/2008 | George et al. | |
| 2004/0247195 A1 * | 12/2004 | Chauville et al. | 382/254 |
| 2006/0239549 A1 * | 10/2006 | Kelly et al. | 382/167 |
| 2008/0080019 A1 * | 4/2008 | Hayashi et al. | 358/474 |
| 2008/0298678 A1 * | 12/2008 | Kang | 382/167 |

FOREIGN PATENT DOCUMENTS

| | | |
|---|---|---|
| EP | 1978394 A1 * | 10/2008 |
| EP | 2096483 A1 * | 9/2009 |

OTHER PUBLICATIONS

George, N. et al., "Extended Depth of Field using a Logarithmic Asphere," Journal of Optics A: Pure Applied Optics, 2003, pp. S157-S163, vol. 5, No. 5.
Mouroulis, P., "Depth of Field Extension with Spherical Optics," Optics Express, Aug. 18, 2008, pp. 12995-13004, vol. 16, No. 17.
U.S. Appl. No. 11/999,101, Robinson, filed Dec. 3, 2007.
U.S. Appl. No. 12/355,625, Feng et al., filed Jan. 16, 2009.

* cited by examiner

*Primary Examiner* — Aung S Moe
*Assistant Examiner* — Chriss Yoder, III
(74) *Attorney, Agent, or Firm* — Fenwick & West LLP

(57) ABSTRACT

A digital-optical imaging system can be operated in two modes, which shall be referred to as broadband mode and grayscale mode. In broadband mode, different color images are captured and then image processed together. The optics are intentionally aberrated to increase the depth of field, with the image processing compensating for the aberrations. In grayscale mode, the different color images are captured and then image processed separately. The color images are assumed to be correlated so that it is not necessary to have clear images of all color channels. Accordingly, the optics are designed so that the different color images focus at different locations, thus increasing the overall depth of field where at least one color image is in focus.

18 Claims, 2 Drawing Sheets

DUAL-MODE EXTENDED DEPTH-OF-FIELD IMAGING SYSTEMS

BACKGROUND OF THE INVENTION

1. Field of the Invention

This invention relates to imaging systems in which specifically aberrated optics are balanced by specific digital image processing.

2. Description of the Related Art

Electro-optic imaging systems typically include optics (e.g., a lens assembly), detectors (e.g., CCD detector array) and digital image processing (e.g., typically implemented in dedicated chips or software). In many imaging applications, the objects of interest have many spectral components. Traditionally, the optical designer optimizes the lens design parameters to minimize a variety of optical aberrations so as to produce a high quality optical image at a single image plane. Applications involving imaging of spectrally broad sources require that these aberrations be minimized over a range of wavelengths dependent on the spectral sensitivity of the detector. In such applications, the dispersion found in optical glasses and plastics makes it difficult to focus all wavelengths at the same point. Without correction, the location of the "in-focus" image plane will vary for different color bands or "channels." The image for the red channel might be in focus at one location, the image for the green channel at another location and the blue channel image at yet a third location. Conversely, positioning the detector array at one fixed location means that one color channel may be in focus while the others are out of focus. This variation of best focus with wavelength is known as axial chromatic aberration or axial color aberration.

The standard practice to minimize axial chromatic aberrations involves choosing lens materials with suitable dispersions to balance the aberrations. The traditional approach attempts to bring all color channels into sharp focus at the same image distance. However, the resulting lens designs can be relatively complex and expensive.

U.S. Pat. No. 5,748,371 to Cathey, Jr. et al. describes a different approach. A phase mask is introduced in the optics so that the aggregate modulation transfer function (MTF) averaged over all color channels is relatively insensitive to shifts in the image plane. Instead of being "sharply in focus" at one location and then degrading fairly rapidly to "extremely out of focus" as the image plane is shifted away from the optimal image distance, the optics in Cathey is designed so that it is "moderately out of focus" over an extended range of image plane positions. That is, the full color image is always somewhat blurry but does not get significantly better or worse as the location of the image plane changes. This effect is used to extend the depth of focus of the overall system. However, one major drawback is that the image is always somewhat blurry. In other words, the MTF suffers from low contrast. Another drawback is that the system must still be designed so that all color channels are at least moderately in focus.

U.S. Pat. Nos. 7,224,540 to Olmstead et al. and 5,468,950 to Hanson describe an opposite approach. In these examples, the objects are limited to the special class in which the images for all color channels are the same. That is, the red channel image must be the same as the green channel image, must be the same as the blue channel image. Both patents concentrate specifically on the imaging of black and white bar codes. For this special case, the black and red bar code (i.e., the image of the black and white bar code in the red color channel) is the same as the black and green bar code, is the same as the black and blue bar code. As a result of this property, any one color channel is sufficient to obtain a complete image of the object. Accordingly, the optics is designed to enhance axial color aberration. Different color channels focus at different image distances. The color channel that is in best focus for the actual object distance is used as the image of the object. Enhancing the axial chromatic aberration extends the effective depth of field of the overall system since it extends the range over which at least one of the color channels will be in focus. However, this approach is limited to this special class of objects and such a system would not be able to acceptably image a color image where the different color channels were uncorrelated, because some of the color channels will always be unacceptably out of focus.

Thus, there is a need for electro-optic imaging systems that can better image color and grayscale objects while addressing some or all of the drawbacks of the current approaches.

SUMMARY OF THE INVENTION

The present invention overcomes the limitations of the prior art by providing a digital-optical imaging system that can be operated in two modes, which shall be referred to as broadband mode and grayscale mode. In broadband mode, different color images are captured and then image processed together. The optics is intentionally aberrated to increase the depth of field, with the image processing compensating for the aberrations. In grayscale mode, the different color images are captured and then image processed separately. The color images are assumed to be correlated so that it is not necessary to have clear images of all color channels. Accordingly, the optics are designed so that the different color images focus at different locations, thus increasing the range over which at least one color image is in focus. The two modes impose opposite requirements on the optics. In broadband mode, the optics ideally is designed so that all color channels behave approximately the same, focusing at approximately the same point. In grayscale mode, the optics ideally is designed so that all color channels behave differently, with each color channel focusing at a different point. The optics is designed to balance these two opposing requirements.

In one implementation, the digital-optical imaging system includes an optics module and a detector module. The optics module produces an optical image of an object. The detector module captures the optical image using at least two different color channels k. Each color channel is defined by a peak wavelength $\lambda_{pk}$. The group of color channels together are characterized by a center wavelength $\lambda_c = (\min\{\lambda_{pk}\} + \max\{\lambda_{pk}\})/2$. The optics module is designed such that, when used in broadband mode, it has a depth of field that is at least as large as that of an equivalent, monochromatic (at $\lambda_c$), aberration-free system. The monochromatic depth of field D* is the defocus range over which the contrast (MTF) at the spatial sampling frequency of the detector module remains above a threshold at the center wavelength. The grayscale depth of field (which is defined as the defocus range over which at least one color channel has sufficient contrast) is at least 10% greater than the broadband depth of field (which is defined as the defocus range over which all color channels have sufficient contrast). A decision module determines whether to operate the system in broadband mode or grayscale mode. The same optics module supports both modes.

In one specific design, the imaging system is designed for RGB use (three color channels). It is also designed so that broadband mode applies to objects that are farther away (e.g., a camera taking a picture of a landscape). Grayscale mode is used for objects that are closer (e.g., the same camera taking a picture of a bar code). In one approach, this is achieved by intentionally introducing positive spherical aberration and axial color aberration. The resulting MTF is asymmetric with respect to focus shift, distinguishing more sharply between different color channels for close objects and less sharply for far objects.

Other aspects of the invention include methods corresponding to the devices and systems described above, and applications for the foregoing.

BRIEF DESCRIPTION OF THE DRAWINGS

The invention has other advantages and features which will be more readily apparent from the following detailed description of the invention and the appended claims, when taken in conjunction with the accompanying drawings, in which:

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1A:
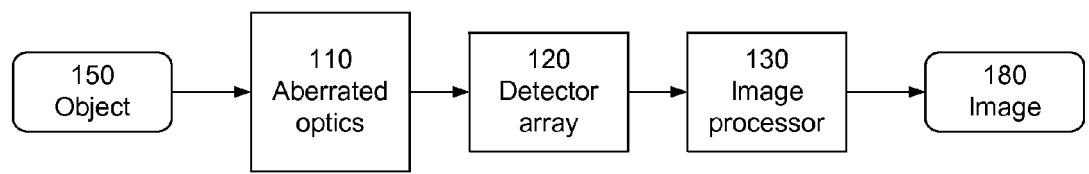
FIG. 1A is a block diagram of a digital-optical imaging system according to the invention.
Figure 1B:
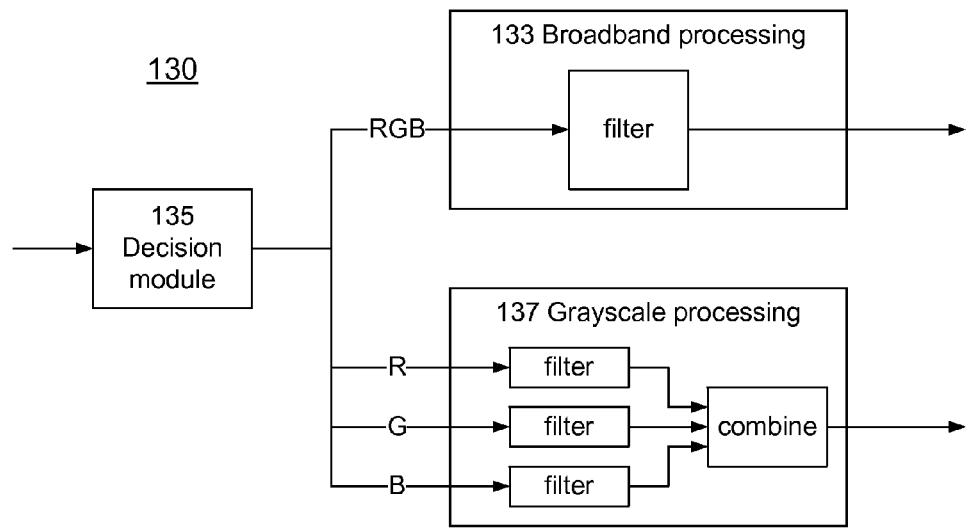
FIG. 1B is a block diagram of an example image processing module for FIG. 1A.

FIG. 1 is a block diagram of a digital-optical imaging system according to the invention. The imaging system includes an optics module 110 (e.g., a lens assembly), a detector module 120 (e.g., CCD detector array) and an image processing module 130 (e.g., typically implemented in dedicated chips or software). As shown in FIG. 1B, the image processing module 130 can be operated in two different modes, which shall be referred to as broadband mode 133 and grayscale mode 137. A decision module 135 switches between the two modes. The imaging system produces a digital image 180 of an object 150.

The imaging system is "digital-optical" in the sense that optics 110 produces an optical image, but the optical image is not high quality. Instead, for reasons described below, the optical module 110 is intentionally aberrated, which results in a degraded optical image. The degraded optical image is captured by the detector array 120, and the captured image is digitally processed by the image processor 130 in one of the two modes to produce the digital image 180. The image processing compensates for the optical aberrations, producing an improved digital image 180. Thus, the optical imaging and the digital image processing work together to produce the digital image 180.

The optics 110 are intentionally aberrated in order to achieve an extended depth of field using different mechanisms for the two modes. In broadband mode, the system behaves as a single color imaging system that has broad through-focus MTF curves for all color channels. For example, the optics may have aberrations that result in a blurred color image, but the blur in each color channel is such that the MTF at the sampling frequency remains above a contrast threshold (e.g., 0.1) for a broad range of defocus, thus resulting in an extended depth of field. In one approach, the image processing module 130 applies the same image processing 133 to all color channels. Since the through-focus MTF curves is broadened, depth-independent processing will restore contrast, preferably to that at least as good as an aberration-free monochromatic system.

In grayscale mode, the system behaves somewhat as a set of separate single-color-channel imaging systems. Each color channel may be relatively sensitive to defocus but the optics are designed so that the color channels are in focus at different points. If the color channels are all the same (e.g., if the object is black and white, or grayscale), then the out of focus channels can be discarded and the in focus channel used. Alternately, the color channels can be combined based on their degree of in or out of focusness. In FIG. 1, the image processing 137 applied to each color channel is different, and the filtered images are then combined. Since each color channel is sensitive to defocus (even though the aggregate of the channels is not because of the correlation between color channels), the image processing 137 preferably is depth-dependent.

Figure 2:
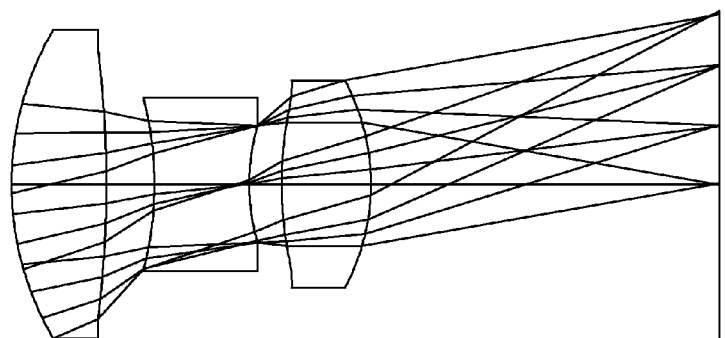
FIG. 2 is a diagram of a triplet suitable for use in the system of FIG. 1.
Figure 3A:
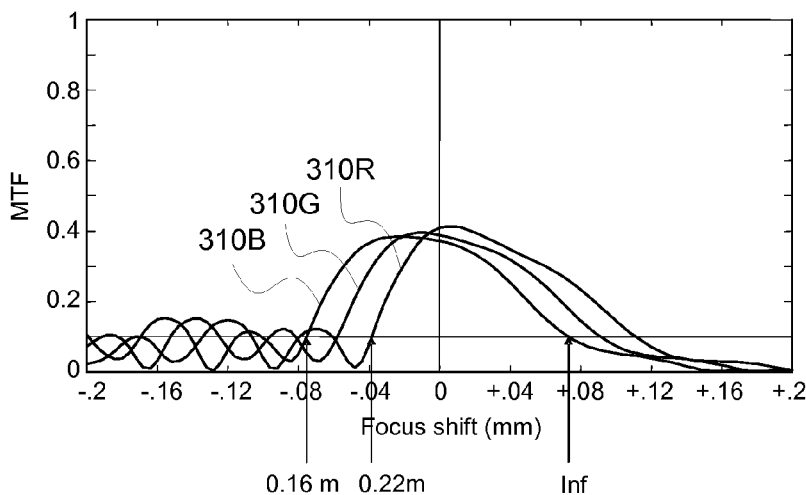
FIG. 3A is a graph of the through-focus MTF of the triplet shown in FIG. 2.
Figure 3B:
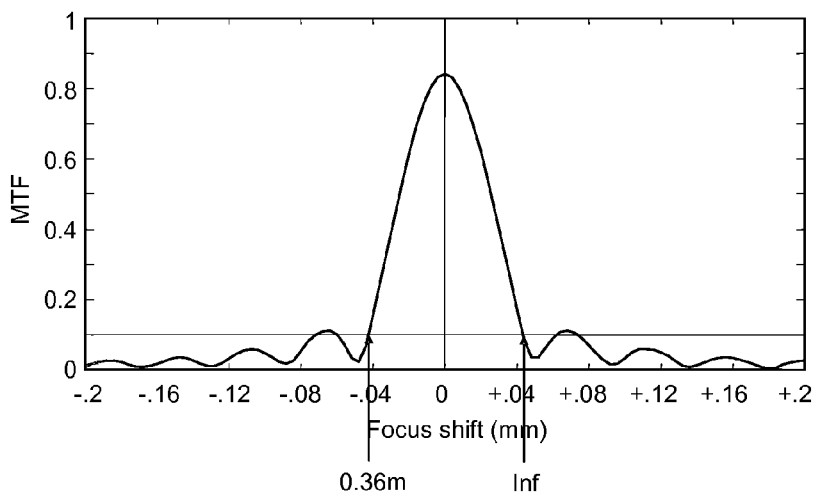
FIG. 3B (prior art) is a graph of the through-focus MTF for an equivalent, monochromatic, aberration-free system.
Figure 4:
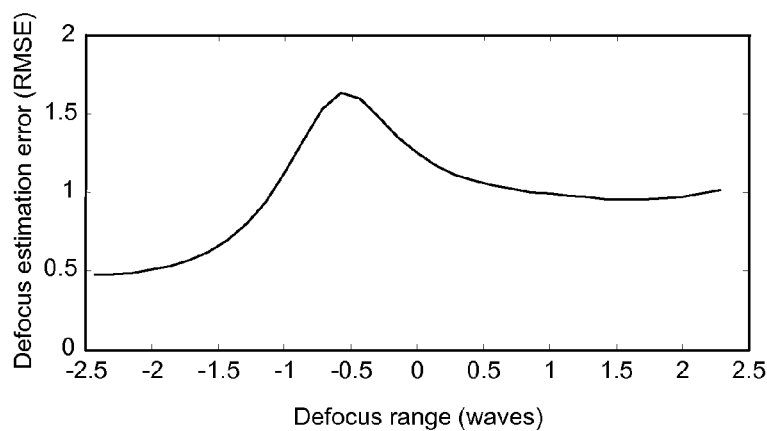
FIG. 4 is a graph of focus shift estimation error as a function of object depth.

These concepts will be illustrated by the specific example of FIGS. 2-4. FIG. 2 is a diagram of a triplet designed for use in broadband mode over a range of object distances and for use in grayscale mode at near object distances. Many consumer applications may be suitable for this type of operation. When a consumer takes a picture of a distant object, it would not be unusual for the object to be a color object with uncorrelated color and the resolution requirements may be not so stringent. In contrast, color-correlated objects such as bar codes, or grayscale documents, are more likely to be located close to the camera and more likely to benefit from higher contrast at close working distances.

This particular example is an approximately F/2.8 optical module with focal length 5.0 mm and 40 degree field of view, operating in the wavelength range of [480, 630] nm. It is designed for RGB operation with 6 μm pitch pixels, where the peak wavelengths for the red, green and blue channels are 480, 540 and 620 nm.

The triplet bears resemblance to a standard Cooke triplet, with the following differences. First, the glass type used for the center element only moderately cancels the axial chromatic aberration of the other two elements so there is a residual axial color aberration which is used to achieve the grayscale mode performance. In this example, there is 34 microns of axial focal shift between the red and blue peak wavelengths, which is compensated later by the image processing. The glass types are SK5 for the outer elements and BAF4 for the center element. Second, the strongly curved third element intentionally induces moderate spherical aberration, which is used to achieve the broadband mode performance. In this case, there is 2.5 waves of spherical aberration, which are compensated later by the image processing. This lens form produces minimal distortion and other aberrations as well and is easy to fabricate as it consists of only spherical surfaces. The lens prescription is shown in Table 1 below.

TABLE 1

Optical prescription for the triplet of FIG. 2

| Surface | Type | Curvature | Thickness | Glass | Semi-Diameter |
|---|---|---|---|---|---|
| 0 | STANDARD | 0.00E+00 | 5.50E+02 |  | 2.01E+02 |
| 1 | STANDARD | 3.15E-01 | 1.00E+00 | N-SK5 | 1.61E+00 |
| 2 | STANDARD | -8.60E-02 | 5.00E-01 |  | 1.40E+00 |
| 3 | STANDARD | -2.94E-01 | 9.00E-01 | BAF4 | 8.91E-01 |
| 4 | STANDARD | 4.71E-01 | 3.00E-01 |  | 6.35E-01 |
| 5 | STANDARD | 2.69E-01 | 1.00E+00 | N-SK5 | 9.07E-01 |
| 6 | STANDARD | -4.36E-01 | 3.69E+00 |  | 1.09E+00 |
| 7 | STANDARD | 0.00E+00 | 0.00E+00 |  | 1.83E+00 |

FIG. 3A is a graph of the through-focus MTF of this triplet. Each of the curves in FIG. 3A graphs the MTF at the sampling frequency of the detector array as a function of a shift in the focus point. In this example, the detector array has a 6 µm pixel pitch and the sampling frequency is approximately 80 lp/mm. The focus shift along the x axis is in mm from the paraxial focus. Each of the three curves 310R,G,B graphs the MTF for the peak wavelengths of the red, green and blue color channels, respectively. Thus, curve 310R graphs the MTF at the sampling frequency at a wavelength of 620 nm, as a function of the focus shift. This system is focused to minimize the broadband hyperfocal distance. The broadband hyperfocal distance is the nearest distance such that at least one color channel has MTF greater than the threshold (in this case 0.1) for all object distances greater than the broadband hyperfocal distance (out to infinity).

For convenience, the color channels may be referred to by the index k, and the peak wavelength of each color channel as the wavelength $\lambda_{pk}$. The color channels taken together can be characterized by a center wavelength $\lambda_c$, which is defined as the average of the minimum peak wavelength and the maximum peak wavelength. That is, $$\lambda_c = (\min\{\lambda_{pk}\} + \max\{\lambda_{pk}\})/2 \quad (1)$$

In this example, $\lambda_c = (480+620)/2 = 550$ nm.

For comparison, FIG. 3B shows the through-focus MTF for an equivalent, monochromatic, aberration-free system. This system is assumed to be aberration free at the center wavelength $\lambda_c$ and perfectly focused at the paraxial focus. In addition, it is equivalent in the sense that it has the same sampling frequency, focal length and F/#, but is focused at different conjugate distance. The monochromatic system is focused to minimize the monochromatic hyperfocal distance. The monochromatic hyperfocal distance is the nearest object distance such that the MTF for all object distances greater than the monochromatic hyperfocal distance is greater than a threshold (in this case 0.1).

For convenience, use MTF=0.1 as a measure of the depth of field for a system. That is, the depth of field is the range of focus shift over which the MTF at the sampling frequency is 0.1 or greater. The monochromatic depth of field D* will be used as a benchmark for comparison. It is the depth of field of the equivalent, monochromatic, aberration-free system. Referring to FIG. 3B, this MTF is symmetric about the paraxial focus and falls below the 0.1 resolution cutoff at slightly below -0.04 mm focus shift and at slightly above +0.04 mm focus shift. This corresponds to object distances between the monochromatic hyperfocal distance of 0.36 m and ∞. D* for this system expressed in waves of focus shift is about 2.0 waves of defocus (at $\lambda_c$).

The broadband depth of field $D_b$ is defined for the broadband mode. It is the depth of field over which the optical module has an MTF greater than 0.1 for all peak wavelengths $\lambda_{pk}$. Referring to FIG. 3A, the negative focus shift edge of the broadband depth of field occurs when 310R falls to 0.1, which is around -0.04 mm focus shift. The positive focus shift edge of the broadband depth of field occurs when 310B falls to 0.1, which is around +0.07 mm focus shift. These points correspond to object distances from the broadband hyperfocal distance of approximately 0.22 m out to infinity. The broadband depth of field $D_b$ for this system is approximately 3.0 waves of defocus (at $\lambda_c$), or 1.5× the monochromatic depth of field D*. This level of enhancement is not required for all systems. However, it is preferable that $D_b \geq D^*$ so that the broadband mode will have a depth of field that is at least as broad as the benchmark case. More preferably, $D_b \geq 1.2\ D^*$.

The grayscale depth of field $D_g$ is defined for the grayscale mode. It is the depth of field over which the optical module has an MTF greater than 0.1 for any of the peak wavelengths $\lambda_{pk}$. Only one color channel need have sufficient contrast because, in grayscale mode, the color channels are assumed to be highly correlated and/or identical. Referring to FIG. 3A, the grayscale depth of field spans a focus shift from approximately -0.08 mm to +0.11 mm. This corresponds to object distances from the grayscale hyperfocal distance of approximately 0.16 m and ∞. This is approximately 3.8 waves of defocus (at $\lambda_c$), or 1.25× the broadband depth of field $D_b$. Other levels of enhancement may be appropriate for other applications. However, it is preferred that $D_g \geq D_b$ so that the grayscale mode will have a depth of field that is broader than the broadband mode. More preferably, $D_g \geq 1.1\ D_b$.

In addition, note the overall shape and asymmetry of the curves in FIG. 3A. The maximum MTF is about 0.4, which is lower than the 0.8 of FIG. 3B, but still sufficiently high to yield good contrast. In addition, the image processing generally will enhance the contrast. More importantly, the through-focus MTF is intentionally asymmetric. This is because the grayscale mode and broadband mode have opposite requirements in some sense. In grayscale mode, it is desirable for the color channels to focus at different points. Hence, their graphs of MTF as a function of focus shift should be separated, with each color channel peaking at a different focus shift. In contrast, in broadband mode, the color channels are treated the same, so their MTF graphs should be approximately the same and less sensitive to focus shift.

This is achieved in FIG. 3A by the asymmetric MTF graphs. At negative focus shift settings (grayscale mode), there is significant variation in the MTF over the different color channels. The blue channel peaks first, and then the green channel and then the red channel. In addition, the MTF for each color channel rises fairly quickly up to the peak. Because the MTF for each color channel is a strong function of the focus shift and because it varies significantly from one color channel to the next, this information can be used to estimate the object depth which, in turn, can be used to determine the depth-dependent filtering for each color channel.

In contrast, at positive focus shift settings, the MTFs do not vary as much from one color channel to the next. The MTFs also are less sensitive to focus shift. Thus, it is harder to estimate object depth but it is also less necessary to do so since the MTF is more depth-invariant. These concepts can be expressed quantitatively, for example based on the first derivative or based on the difference in MTF between the min and max peak wavelengths. In FIG. 3A, the first derivative $|dMTF(\lambda_c)/d(\text{focus shift})|$ is greater at the negative focus shift edge of the broadband depth of field (focus shift of approximately -0.04), than at the positive focus shift edge of the broadband depth of field (focus shift of approximately +0.07). For the same reasons, the MTF difference across color channels, $[\max\{MTF(\lambda_{pk})\} - \min\{MTF(\lambda_{pk})\}]$, is greater at the negative focus shift edge of the broadband depth of field than at the positive focus shift edge of the broadband depth of field.

The system is capable of operating in either broadband mode or grayscale mode. The difference between the modes occurs primarily in the image processing. That is, the optics module and detector array usually will operate the same in both modes. The optical image produced by the optics and the digital image captured by the detector are the same for both modes. It is the subsequent image processing that differentiates between broadband mode and grayscale mode (although the optics must be properly designed to support both modes).

Referring to FIG. 1, the decision module 135 can be implemented in a variety of ways. For example, it could be based on a user selection. That is, the user could manually switch between broadband and grayscale mode. Alternately, it could be based on the detection of some known grayscale object such as a barcode. Many grayscale objects such as barcodes can be detected from a blurry image, but not decoded. Thus, when the system is used in broadband mode, if it detects a grayscale object, it may automatically switch to grayscale mode. The image processing system might also segment the image based on detection of the grayscale object such that different portions of the image use either the broadband/or grayscale image processing. This image segmentation might be automatically computed or selected by a user.

Now consider the image processing modules 133 and 137 for the two modes. Various types of image processing can be used. One example will be given below. Denote the optical transfer function (OTF) of the optics module for a particular color channel as $H_k(U_1,U_2)$ for the kth color channel where U is spatial frequency.

Capturing a grayscale object requires estimating the object distance to properly restore the grayscale image. Estimating the object depth depends on the relative MTF difference in the different color channel images. The MTF for a particular object distance is denoted $H_k(U_1,U_2,d)$ where d is the unknown object depth. The ability to estimate object depth d is a function of the amount of change in the MTF as a function of the object depth d. For example, the ability to estimate object depth can be measured by $$J(d, H_k) = \sum_k \int_{U_1, U_2 < U^*} \left| \frac{\partial}{\partial d} H_k(U_1, U_2, d) \right|^2 dU_1, dU_2 \quad (2)$$

where U* is half the spatial sampling frequency of the detector module. Higher values of J mean that the object depth can be estimated more accurately.

The error in estimating the depth (root-mean-square error or RMSE) is approximately $$\frac{1}{J(d, H_k)}.$$

FIG. 4 graphs the expected error depth estimate (RMSE) in estimating the object depth for the system of FIG. 2, as a function of the object depth. Both the object depth (x axis) and the depth estimation error (y axis) are expressed in waves of defocus from the paraxial focus. The system is designed for more accurate depth estimates when used in grayscale mode, as evidenced by the relatively flat, low depth estimation error for negative values of focus shift, which corresponds to close objects. The relatively large change in MTF between the three color channels enables this depth estimation accuracy. The advantage of this system is that at least one color channel has high MTF value throughout the depth range.

The object distance could be estimated in a number of ways. In one instance, the relative amount of high-frequency image content between the three color channels can be fit to the relative MTF between the color channels.

In grayscale mode, after estimating the object distance $\hat{d}$, the multiple color images are sharpened according to the estimated depth. For example, the Wiener filter based on the depth estimate is given by $$R_k(U_1, U_2, \hat{d}) = \frac{H_k(U_1, U_2, \hat{d})*}{|H_k(U_1, U_2, \hat{d})|^2 + \alpha} \quad (3)$$

where $\alpha$ is some regularization parameter depending on the SNR. Thus, the filter response changes according to the estimated depth. It is also different from one channel to the next since the MTF H is different for each color channel.

The filtered color images can be combined in different ways. For example, a simple way is to just keep the "best" color image and discard the others. As an alternative, the color channel images could also be combined using a weighted average. The weighting might depend on the relative noise levels in each of the color channels or the relative MTF in each color channels. For further examples and information about pure grayscale mode, see U.S. patent application Ser. No. 11/999,001, "End-to-end Design of Electro-Optic Imaging Systems for Color-Correlated Objects," by M. Dirk Robinson, which is incorporated herein by reference.

In broadband mode, the image processing 133 can also take different forms. In one approach, a depth-independent sharpening filter is applied to the image. For example, one such depth-independent filter is given by an inverse filter for one particular depth location d'

$$R_k(U_1, U_2) = \frac{H_k(U_1, U_2, d')*}{|H_k(U_1, U_2, d')|^2 + \alpha} \quad (4)$$

where $\alpha$ is some regularization parameter. The single depth d' can be chosen as the paraxial focus, or the focus that maximizes the MTF, as examples. For further examples and information about pure broadband mode, see U.S. patent application Ser. No. 12/355,625, "Imaging System Using Enhanced Spherical Aberration and Specifically Sized FIR Filters," by Guotong Feng and M. Dirk Robinson, which is incorporated herein by reference.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

What is claimed is:

1. A digital-optical imaging system comprising:
   an optics module that produces an optical image of an object; and
   a detector module positioned to capture the optical image produced by the optics module, the detector module characterized by a sampling frequency, the detector module capturing at least two different color channels k of the optical image, each color channel defined by a peak wavelength $\lambda_{pk}$, all of the color channels together characterized by a center wavelength $\lambda_c = (\min\{\lambda_{pk}\} + \max\{\lambda_{pk}\})/2$;
   wherein the optics module is characterized by
   $$D_b \geq D^* \text{ and } D_g \geq 1.1 D_b, \text{ where}$$
   - $D^*$ = the monochromatic depth of field, defined as the depth of field (measured in waves of $\lambda_c$) over which an ideal equivalent optical module that is monochromatic and aberration-free at wavelength $\lambda_c$ has an MTF at the sampling frequency greater than 0.1,
   - $D_b$ = the broadband depth of field, defined as the depth of field (measured in waves of $\lambda_c$) over which the optical module has an MTF at the sampling frequency greater than 0.1 for all $\lambda_{pk}$, and
   - $D_g$ = grayscale depth of field, defined as the depth of field (measured in waves of $\lambda_c$) over which the optical module has an MTF at the sampling frequency greater than 0.1 for at least one $\lambda_{pk}$.

2. The digital-optical imaging system of claim 1 further comprising:
   an image processing module coupled to the detector module, the image processing module capable of both (a) depth-independent image processing for all color channels and (b) depth-dependent image processing for each color channel.

3. The digital-optical imaging system of claim 2 wherein the depth-dependent image processing includes estimating a depth to the object and applying a depth-dependent sharpening filter that is a function of the estimated depth and of the color channel.

4. The digital-optical imaging system of claim 2 wherein depth-independent image processing is applied to objects that are further away and depth-dependent image processing is applied to objects that are closer.

5. The digital-optical imaging system of claim 2 wherein depth-independent image processing is applied to objects that are imaged with more positive focus shift and depth-dependent image processing is applied to objects that are imaged with more negative focus shift.

6. The digital-optical imaging system of claim 2 wherein the image processing module further comprises a user input to allow the user to select between (a) depth-independent image processing for all color channels and (b) depth-dependent image processing for each color channel.

7. The digital-optical imaging system of claim 2 wherein the image processing module further comprises a decision module to automatically select between (a) depth-independent image processing for all color channels and (b) depth-dependent image processing for each color channel.

8. The digital-optical imaging system of claim 2 wherein the image processing module applies depth-independent image processing to a portion of the image captured by the detector module and applies depth-dependent image processing to a different portion of said image.

9. The digital-optical imaging system of claim 1 wherein the detector module captures at least three different color channels k of the optical image.

10. The digital-optical imaging system of claim 9 wherein the detector module captures red, green and blue color channels of the optical image.

11. The digital-optical imaging system of claim 9 wherein the detector module captures three color channels of the optical image, with $\lambda_{p1}=480$ nm, $\lambda_{p2}=540$ nm and $\lambda_{p3}=620$ nm.

12. The digital-optical imaging system of claim 1 wherein $MTF(\lambda_{pk})$ is asymmetric as a function of focus shift.

13. The digital-optical imaging system of claim 1 wherein $|dMTF(\lambda_c)/d(\text{focus shift})|$ is greater at the negative focus shift edge of the broadband depth of field, than at the positive focus shift edge of the broadband depth of field.

14. The digital-optical imaging system of claim 1 wherein the difference $[\max\{MTF(\lambda_{pk})\} - \min\{MTF(\lambda_{pk})\}]$ is greater at the negative focus shift edge of the broadband depth of field, than at the positive focus shift edge of the broadband depth of field.

15. The digital-optical imaging system of claim 1 wherein $D_b \geq 1.2 D^*$.

16. The digital-optical imaging system of claim 1 wherein $D_b \geq 1.5 D^*$.

17. The digital-optical imaging system of claim 1 wherein $D_g \geq 1.25 D_b$.

18. The digital-optical imaging system of claim 1 wherein the optical module is characterized by positive spherical aberration and axial color aberration.

* * * * *